United States Patent Office 2,920,983
Patented Jan. 12, 1960

2,920,983

HYDROPHILIC POLYURETHANE FOAM STRUCTURE AND PROCESS

John Bugosh, Wilmington, Del., assignor to E. I. du Pont de Nemours and Company, Wilmington, Del., a corporation of Delaware No Drawing. Application November 21, 1957
Serial No. 697,778

3 Claims. (Cl. 117—98)

This invention relates to improvements in porous structures, and more particularly to a process for improving the water absorption capacity of polyurethane foams and to the improved products of the process.

Polyurethane foams form sponge-like materials having abrasive, wear-resistant, heat-resistant surfaces. Polyurethane foams, however, unlike regenerated cellulose and natural sponges, are strongly hydrophobic and thus do not absorb water except by a slight wicking action. Likewise, the permeability of polyurethane foams is very low since a portion of the closed pores caused by foam bubbles do not break, or do not break on all faces, during the foaming and curing steps. Thin skins appear to stretch between all the lamellae of the cured foams preventing free flow of fluids through the foam.

It is obvious that if hydrophobic polyurethane foams could be made hydrophilic, i.e., could be made to more readily absorb water, the flushing of dirt from the foams would be facilitated, there would be less physical effort required to squeeze or wring fluid from the foam, the foams would pick up more fluid when squeezed and released under the surface of the fluid, the foams could absorb more fluid in a given time, and in general the utility of these foams would be greatly enhanced. However, the expedients heretofore suggested for rendering polyurethane foams hydrophilic have failed to produce a satisfactory improvement in fluid absorption, or have deteriorated the foam to such a degree that the foam for any pratical purpose was rendered useless.

An object of this invention, therefore, is to provide a simple, economical process for rendering polyurethane foam structures hydrophilic. Another object is to provide modified polyurethane foam structures which are hydrophilic, i.e., which more rapidly absorb greater quantities of water than do unmodified polyurethane foam structures. The foregoing and other objectives will more clearly appear hereinafter.

These objects are realized by the present invention which, briefly stated, comprises impregnating a porous structure of a polyurethane foam with an aqueous solution of aluminum sulfate and thereafter drying the impregnated structure at elevated temperatures whereby to produce a hydrophilic porous structure of polyurethane foam, the pore walls of which are coated with aluminum sulfate.

The preparation of polyurethane foam structures by reacting water with free isocyanate radical-containing organic polymeric products is described in "German Plastics Practice" by De Bell et al., 1946, pp. 316 and 463-465. Polyurethane foams applicable to this invention may be produced by employing reactants and methods, such as disclosed in U.S. Patents Numbers 2,282,827 (Rothrock); 2,284,637 (Catlin); 2,284,896 (Hanford et al.); 2,292,443 (Hanford); 2,333,639 (Christ et al.); 2,358,475 (Pratt et al.); 2,374,163 (Rothrock); 2,787,601 (Detrick et al.); and U.S. applications Serial Numbers 369,240 now Patent No. 2,788,335 (Barthel), filed July 20, 1953; 383,370, now Patent No. 2,833,730 (Barthel), filed September 30, 1953; 395,843, now Patent No. 2,842,506 (Roussel), filed December 2, 1953; and 405,036, now Patent No. 2,814,600 (Mitchell), filed January 9, 1954. In general, the free isocyanate radical-containing organic polymers embrace a wide variety of compounds and are prepared by reacting a polymeric organic substance containing a plurality of groups containing active hydrogen atoms with an organic compound containing as the sole reacting group a plurality of isocyanate groups.

An organic compound containing as the sole reacting group a plurality of isocyanate groups may be any of the poly-NCO compounds, i.e., any polyisocyanate. The preferred compounds are those having two groups of the formula —NCO. Examples of this class are: 2,4-toluene diisocyanate, 2,6-toluene diisocyanate, m-phenylene diisocyanate, 4-chloro-1,3-phenylene diisocyanate, 1-chloro-phenylene 2,4-toluene diisocyanate and naphthalene-1,5-diisocyanate.

Polymeric organic substances containing a plurality of groups containing active hydrogen may be selected from a wide variety of polyfunctional compounds, including polyamines, polyalcohols, aminoalcohols, polyhydroxy ethers, polyhydroxy esters, polyamides, polythiols, polysulfonamides and various mixtures of these types. Typical of many organic compounds which are useful in this connection are ethylene glycol, diethylene glycol, glycerine, diethanolamine, N-ethylethanolamine, triethanolamine, adipamide, m-phenylene diamine, propylene diamine, sulfanilamide, p-aminophenol, succinamide and 2,4-toluene diamine. Other long chain polyhydroxy and polycarboxy compounds useful in this invention are alkyd resins containing terminal hydroxyl and carboxyl groups. Examples of the alkyd resin reactants are: glycols, glycerine, trimethylol propane reacted with dibasic acids, such as adipic, phthalic, succinic, maleic and carbonic.

The term "active hydrogen" is used herein to denote hydrogen atoms which display activity according to the Zerewitinoff tests, as described by Kohler in Journal of American Chemical Society, 49, p. 3181 (1927).

A tertiary amine catalyst is preferably used during the formation of the foam to accelerate the reaction between the isocyanate, water and active hydrogen-containing compounds, and also by proper selection of the catalyst to control the rate of foaming and the cell structure of the foam. The catalyst may be omitted and a longer time for curing may be used, or the reaction may be speeded up by the use of elevated temperatures. However, it is much simpler and more practical to add the tertiary amine catalyst to cause the reaction to take place rapidly and permit the final curing at room temperature. The more basic amines appear to be the most effective as catalysts, and those of relatively low volatility are preferred so that they will not escape to any objectionable degree during the reaction and so they will not impart to the product an objectionable odor. The following tertiary amines are illustrative of those particularly useful as catalysts in this reaction: N-methyl morpholine, triethylamine, diethylcyclohexylamine, dimethylhexadecylamine, triethanolamine, pyridine, quinoline and 3-methyl-isoquinoline. The amount of catalyst may range from essentially none at all to several times by weight the amount of water used.

The concentration of aluminum sulfate $$Al_2(SO_4)_3 \cdot 18H_2O$$

in aqueous solution of aluminum sulfate may vary within the range of from 0.5% to 48%, and preferably from 2% to 4% by weight, based on the total weight of the solution. Impregnation of the foam structure by the solution of aluminum sulfate is followed by drying, preferably in air, at an elevated temperature within the range of 50°–120° C.

The following examples of preferred embodiments will further serve to illustrate the principles and practice of this invention. Percentages are by weight unless otherwise indicated.

*Example 1*

A polyurethane foam was made by mixing 432 grams of a mixture consisting of 80% toluene-2,4-diisocyanate and 20% toluene-2,6-diisocyanate for 10 seconds using bent wire mixers turning at a slow speed with a mixture consisting of:

Polyester resin [1] _____ grams__ 1049
Emulsifier (polyoxyethylated vegetable oil)
                                       grams__ 15
Water _____ cc___ 38
N-methyl morpholine _____ cc___ 15
Diatomaceous silica—average particle size 2.4
  microns _____ grams__ 30

[1] Polyester resin-reaction product of diethylene glycol, adipic acid, and trimethyl propane in a 13/13/1 molar ratio. Physical properties are:
Viscosity ----------------------------------cps-- 16,000
Acid No. -------------------------------------- 2.02
Specific gravity ------------------------------- 1.194
Percent water ---------------------------------- 0.17
Solids ----------------------------------percent-- 100
Hydroxyl No. ----------------------------------- 66.8

As quickly as possible the foam was poured into a mold 13" x 15" x 19". Foaming takes place in about 15–30 seconds and is complete in 2 minutes. The foam was cured overnight at room temperature.

The resulting hydrophobic polyurethane foam was impregnated with a 2% solution of aluminum sulfate $(Al_2(SO_4)_3 \cdot H_2O)$, squeezed to remove excess solution and then oven-dried at 70° C. for one hour to produce hydrophilic foam.

The rate of water absorption of the treated foam in any direction was ⅛–1 inch per second in any direction. The rate of absorption for foam made in an identical manner except that it had not been treated as described, was less than ⅙ inch per second. This rate of absorption was measured after thorough washing with water and wringing in a washing machine wringer. The rate was observed by immersing the foam in a water solution at room temperature containing a small amount of nigrosine black water soluble dye and observing the rise of water containing dye.

The improved rate of absorption is further demonstrated by the amount of water picked up from a shallow tray of water in a short time. The sample of the produce described above, 3" x 3" x 1", was thoroughly wet with water and squeezed in a washing machine wringer to remove excess water and weight. The sample was then laid on a porous grid positioned ⅛" beneath the surface of the water and after exactly 5 seconds, the sample was removed and weighed to determine the amount of water absorbed in the foam. A control of the same size was tested in the same manner. The treated foam absorbed 36 grams of water in the allotted time whereas the control sample absorbed only 2 grams of water.

The water permeability of the product of this example was greatly improved over the control. A 1" section of this product was held tightly between 2" pipe flanges and a 2' head of water was maintained above the sample. The rate of water flow through the sample was measured. Controls of the same thickness, made in an identical manner but with no treatment after foaming and curing were also tested. The rate of flow through the treated foam sample was about 5070 grams per minute, and through the control sample was about 3300 grams per minute.

*Example 2*

A prepolymer was prepared as follows: 300 grams of a polyether block copolymer containing 90% polypropylene oxide with 10% polyethylene oxide (molecular weight approximately 200) and 27.3 grams of toluene diisocyanate were heated together at 120° C. with stirring under a nitrogen blanket for two hours. An additional 64.2 grams of toluene diisocyanate were slowly added at 120° C. during 30 minutes. The reaction mixture was then quickly cooled to 30° C. To form a foam structure, 50 grams of the resulting prepolymer together with 0.5 gram of polyoxyethylated vegetable oil, 0.5 gram of N-methyl morpholine and 0.5 gram of water were rapidly mixed and then poured in a mold to foam. After the foam had raised to its maximum height, it was placed in an oven at 75° C. to cure for 4 hours. This foam was very soft and springy, but does not wet well with water.

A sample of this foam was then impregnated with a solution of aluminum sulfate as described in Example 1 and was oven-dried. The treated sample showed improved wicking and absorption properties of the order of the previous example.

The unique feature of the present invention is that a previously hydrophobic polyurethane foam is made hydrophilic. This property, in addition to its unaltered properties of "feel," appearance, wear-resistance, heat-resistance, permanent softness, abrasiveness and freedom from bacterial degradation that give it customer appeal, make polyurethane foam sponges desirable for household and industrial useage. As a result of the treatment of this invention, flushing dirt from the foam is improved, less physical effort is required to squeeze or wring the water from the foam, the foam picks up more water when squeezed under the surface of a fluid, and the treated foams absorb more water from the surface in a given time since the foam is more permeable.

Specific improved products which can be made by application of the above invention, in addition to all-purpose household and industrial scrubbing and wiping sponges mentioned before, include household and industrial scrubbing and wiping mops and a quick-drying sponge mop which is less susceptible to bacterial degradation. Other sponge uses, such as disclosed in Banigan et al., U.S. Patents Numbers 2,280,022 and 2,295,823 and Saffert, 2,138,712, may apply to the improved product and provide functional uses and wider utility than any sponge herebefore known. It will be understood that polyurethane foams treated so that they become hydrophilic by the treatment of the present invention may be used for any purpose for which their hydrophilic properties render them suitable.

The hydrophilic properties obtained by treating polyurethane foam structures in accordance with the process of this invention may be preserved against the deteriorating action of soaps and detergents and rendered permanent by further treating the foam structures with an aqueous dispersion of an inorganic negative colloid such as polysilicic acid, as described and claimed in the copending application of John Bugosh, Serial No. 734,410, filed May 12, 1958, or with an aqueous dispersion of finely divided hydrophilic organic polymer, as described and claimed in the copending application of John Bugosh, Serial No. 734,409, filed May 12, 1958.

I claim:

1. A hydrophilic structure comprising a porous structure of a polyurethane foam the pore walls of which are coated with aluminum sulfate.

2. The process which comprises impregnating a polyurethane foam structure with an aqueous solution of aluminum sulfate and thereafter drying said structure.

3. The process which comprises impregnating a polyurethane foam structure with an aqueous solution of aluminum sulfate, said solution containing from 2% to 4% of aluminum sulfate, and thereafter drying said structure at a temperature of from 50°–120° C.

References Cited in the file of this patent

UNITED STATES PATENTS

| | | |
|---|---|---|
| 2,257,911 | Kraft | Oct. 7, 1941 |
| 2,577,280 | Simon | Dec. 4, 1951 |
| 2,602,783 | Simon | July 8, 1952 |
| 2,620,349 | Slocombe | Dec. 2, 1952 |

UNITED STATES PATENT OFFICE

CERTIFICATE OF CORRECTION

Patent No. 2,920,983 January 12, 1960

John Bugosh

It is hereby certified that error appears in the printed specification of the above numbered patent requiring correction and that the said Letters Patent should read as corrected below.

Column 1, line 58, for "of polyurethane" read -- of a polyurethane --; column 2, line 10, after "1953;" insert -- 381,745, now Patent No. 2,850,464 (Mitchell), filed September 21, 1953; --; column 3, line 68, for "produce" read -- product --; column 4, line 19, for "200" read -- 2000 --.

Signed and sealed this 5th day of July 1960.

(SEAL)
Attest:

KARL H. AXLINE
Attesting Officer

ROBERT C. WATSON
Commissioner of Patents